(12) United States Patent
Rich et al.

(10) Patent No.: US 9,808,920 B2
(45) Date of Patent: Nov. 7, 2017

(54) TOOL AND METHOD FOR REMOVING A WHEEL HUB ASSEMBLY

(71) Applicants: Bosch Automotive Service Solutions LLC, Warren, MI (US); Robert Bosch GmbH, Stuttgart (DE)

(72) Inventors: Kevin Rich, Columbus, IN (US); Robert Kochie, Dodge Center, MN (US); Robert Jensen, Clarks Grove, MN (US); Dennis Hanson, Medford, MN (US)

(73) Assignees: Bosch Automotive Service Solutions Inc., Warren, MI (US); Robert Bosch GmbH, Stuttgart (DE)

(*) Notice: Subject to any disclaimer, the term of this patent is extended or adjusted under 35 U.S.C. 154(b) by 175 days.

(21) Appl. No.: 14/621,809

(22) Filed: Feb. 13, 2015

(65) Prior Publication Data

US 2015/0231774 A1     Aug. 20, 2015

Related U.S. Application Data

(60) Provisional application No. 61/939,902, filed on Feb. 14, 2014.

(51) Int. Cl.
*F16D 3/40* (2006.01)
*B25B 27/00* (2006.01)

(52) U.S. Cl.
CPC .......... *B25B 27/0035* (2013.01); *F16D 3/405* (2013.01); *Y10T 29/49822* (2015.01); *Y10T 29/53983* (2015.01)

(58) Field of Classification Search
CPC ......... Y10T 29/53796; Y10T 29/53861; Y10T 29/53865; Y10T 29/53983; Y10T 29/49822; B25B 27/0035
See application file for complete search history.

(56) References Cited

U.S. PATENT DOCUMENTS

| | | | | |
|---|---|---|---|---|
| 2,191,021 A | * | 2/1940 | Ladd | ............... B25B 27/02 29/253 |
| 4,562,631 A | * | 1/1986 | Welch | ............... B25B 27/023 29/259 |

* cited by examiner

*Primary Examiner* — Sarang Afzali
*Assistant Examiner* — Ruth G Hidalgo-Hernandez
(74) *Attorney, Agent, or Firm* — Maginot Moore & Beck LLP (57) ABSTRACT

A wheel hub removal tool is provided that allows a single technician to readily remove the hub using the vehicle steering. The tool is a generally U-shaped bracket that is seated on the ball-joint to support a pair of arms on opposite sides of the U-joint assembly. The arms carry corresponding blocks that are sized to seat between the drive axle housing and a component of the U-joint that is coupled to the wheel hub. The tool maintains a block on either side of the U-joint assembly so that pressure may be applied alternatively between the blocks to gradually dislodge the wheel hub from the axle. The tool is adjustable to accommodate different axle hub and bearing assembly configurations for different vehicles.

13 Claims, 7 Drawing Sheets

TOOL AND METHOD FOR REMOVING A WHEEL HUB ASSEMBLY

REFERENCE TO RELATED APPLICATION AND PRIORITY CLAIM

This application is a non-provisional application of and claims priority to provisional application Ser. No. 61/939,902, filed on Feb. 14, 2014, the entire disclosure of which is incorporated herein by reference.

BACKGROUND

Front axle hub and bearing assemblies for many vehicles can be very difficult to remove, particularly after years of use, wear and corrosion. For example, the front axles of certain ¾ and 1 ton pickup trucks from 1994 to the present have been found to be extremely difficult to remove. Many tools and techniques have been developed by service technicians and service equipment suppliers to enable removal of wheel hub and bearing assemblies, and many of these tools and techniques can risk damaging the viable parts that are not intended to be replaced or repaired. Some techniques simply rely on brute force, such as by pounding on the wheel rotor with a sledge hammer, but this approach risks bending or breaking vehicle components. Other techniques use a torch to heat the hub so that it expands, thereby allowing the hub to be removed, but this approach risks damaging the wheel bearing and seal. Moreover, these approaches can be very time-consuming.

Figure 1:
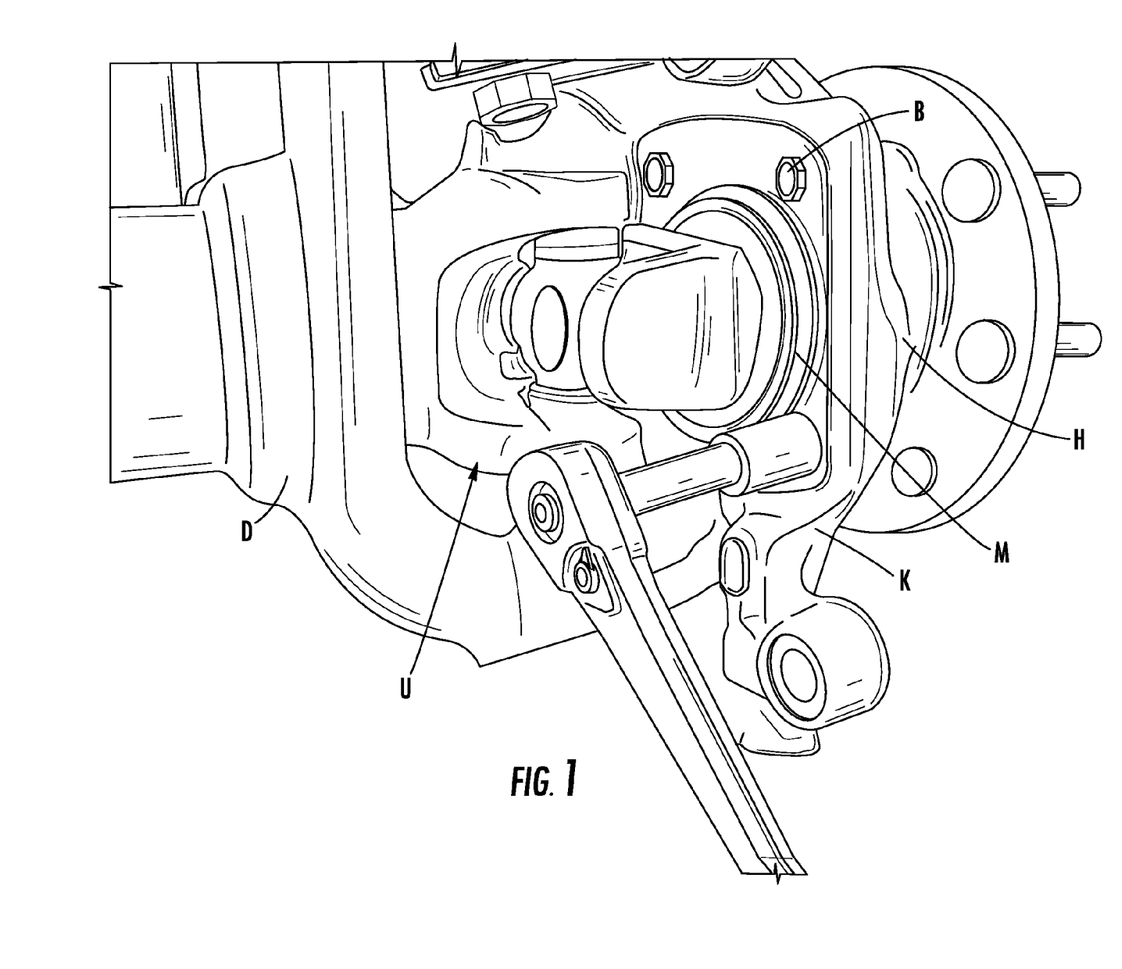
FIG. 1 is a perspective view of a wheel hub, axle and bearing assembly for a vehicle.
Figure 2:
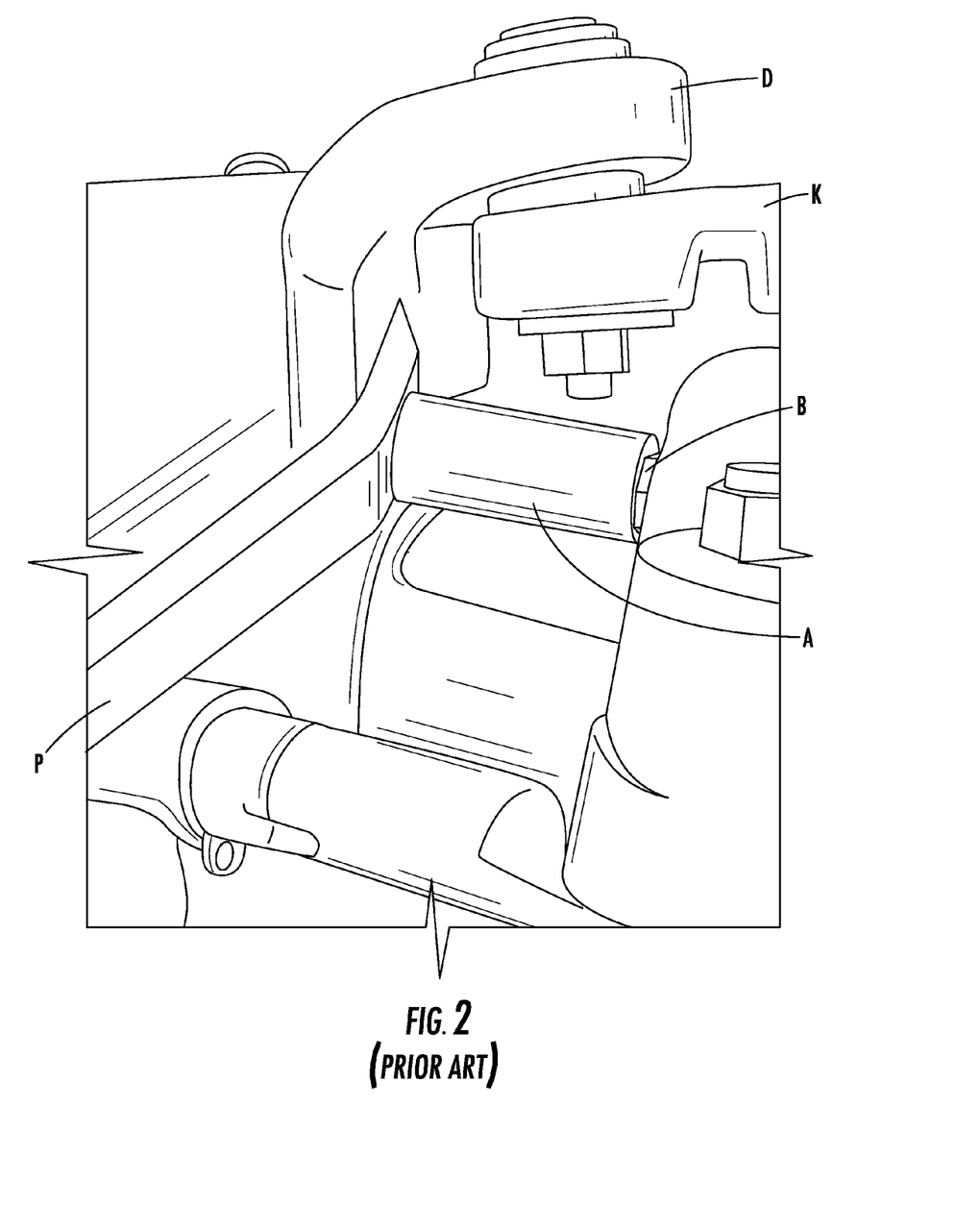
FIG. 2 is a perspective view of a hub removal tool according to a procedure of the prior art.

Another approach involves applying force to the inside of the wheel hub. An example is shown in FIGS. 1-2. In the first step, the hub bolts B are loosened from the hub mount M for the wheel hub H, as depicted in FIG. 1. The knuckle hub K, U-joint assembly U and drive axle housing D are also shown in the figure. An adapter A is positioned over a loosened bolt B, as shown in FIG. 2. A long pry bar P is positioned between the drive axle housing D and the free end of the adapter A, as shown in FIG. 2. The technician then pulls the pry bar P to apply a force against the bolt B until the wheel hub H breaks loose. Typically, two such adapters A are positioned on bolts at opposite sides of the wheel hub, which requires the technician to alternate the pry bar position.

Figure 3:
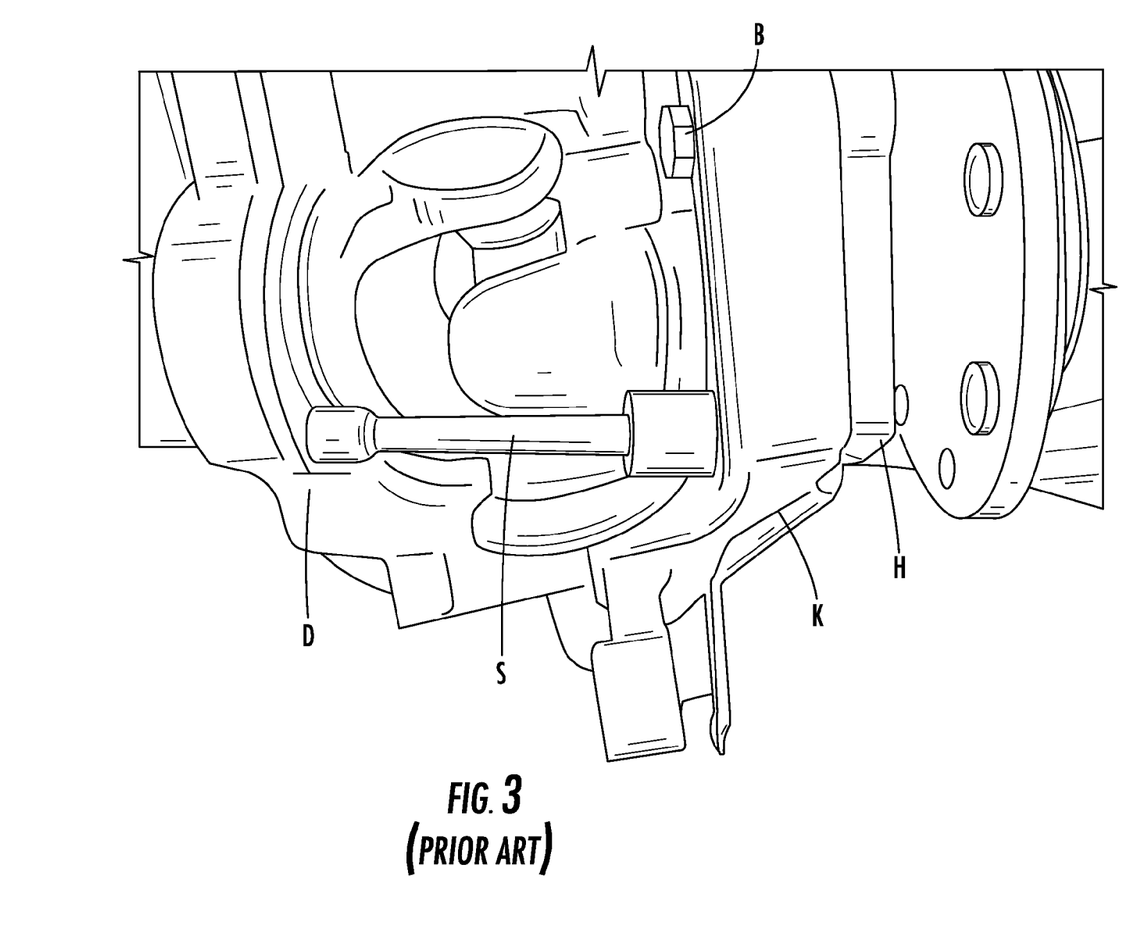
FIG. 3 is a perspective view of another hub removal tool and procedure of the prior art.
Figure 4:
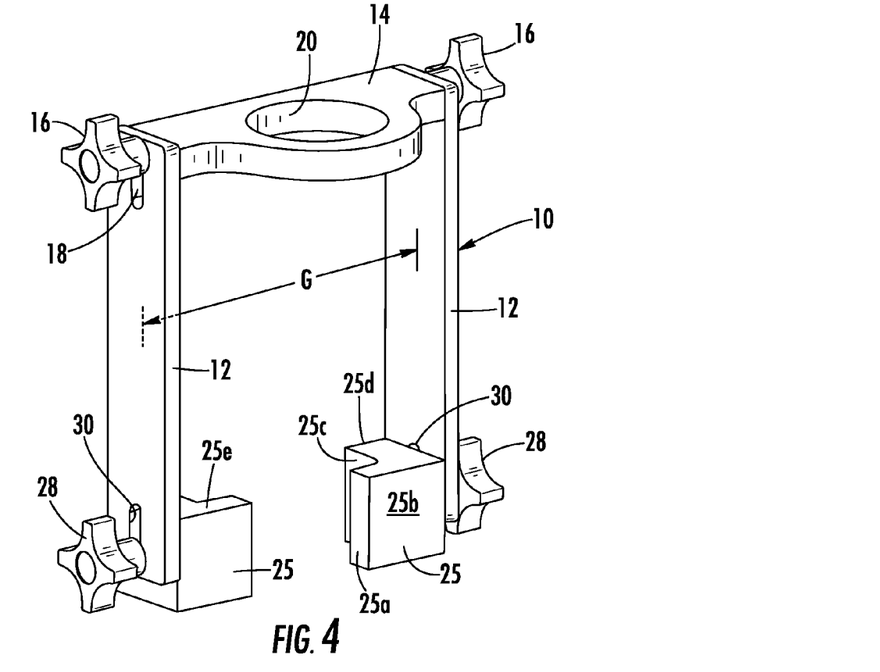
FIG. 4 is a front perspective view of a hub removal tool according to one aspect of the present disclosure.

Another approach eliminates the need for the pry bar and instead utilizes the vehicle steering assembly to apply the force on the hub bolts. Thus, as depicted in FIG. 3, a socket extension S is placed between the drive axle housing D and the hub bolt B. With the socket extension in position, the steering wheel is turned so that the knuckle hub K and hub H pivot toward the socket extension S. This in turn provides a pushing force against the bolt B to gradually dislodge the bolt. As with the technique shown in FIG. 2, the socket extension S must be moved to another bolt in order to eventually dislodge the hub B from the drive axle. This technique requires two technicians—one to support the socket extension S until it is wedged between the axle housing D and the hub mounting bolt B, and the other technician to operate the vehicle steering. This technique also exposes the technician holding the socket extension to a hazardous situation as the forces are applied to the extension S, such as if the socket extension slips and is projected outward toward the technician.

Removing the wheel hub is a very common activity in the repair and maintenance of vehicles. It is therefore desirable to have a tool and method for removing the wheel hub that is quick and efficient and that does not risk injury to the technician or damage to the vehicle components.

SUMMARY

A hub removal tool is provided for use by one person for removing a wheel hub of a vehicle having a knuckle hub and U-joint assembly between the wheel hub and a drive axle housing, and a ball joint connection between the knuckle hub and the drive axle housing. The tool comprises an elongated support plate defining a bore therethrough sized to seat the support plate on the ball joint connection and a pair of elongated arms mounted to at one end thereof to opposite ends of the elongated plate. The arms are sized so that the opposite ends of the arms are positioned in alignment with the space between opposing surfaces of the drive axle housing and the U-joint assembly. The tool further comprises a pair of blocks, one each mounted at the opposite end of a corresponding one of the pair of arms. The blocks are arranged to be disposed within the space between the opposing surfaces. Each block defines opposite contact surfaces for contacting corresponding ones of the opposing surfaces of the drive axle housing and the U-joint assembly when the vehicle steering is operated to rotate the wheel hub about the ball joint connection.

In one aspect, the arms are adjustably mounted to the elongated plate. In a further aspect, the blocks are also adjustably mounted to the corresponding one of the arms. The adjustable mountings permit adjustment of the position of the blocks along the length of the arms, as well as the angular relationship of the arms to the support plate and of the blocks to the arms, as needed to accommodate the vehicle structure. The support plate has a length so that the arms define a gap therebetween when mounted to the support plate, the gap sized to straddle the U-joint assembly when the support plate is seated on the ball joint connection.

A method is provided for one person removal of a wheel hub of a vehicle having a knuckle hub and U-joint assembly between the wheel hub and a drive axle housing, and a ball joint connection between the knuckle hub and the drive axle housing. According to the method, the person seats an elongated support plate on the ball joint connection, the support plate having a pair of elongated arms extending from opposite ends of the support plate with the ends of the arms positioned in alignment with the space between opposing surfaces of the drive axle housing and the U-joint assembly. The person adjusts the position of a pair of blocks, one each mounted at the end of a corresponding one of the pair of arms, so that opposite contact surfaces of each block are positioned in contact with or immediately adjacent opposing surfaces of the drive axle housing and the U-joint assembly. The person can then operate the vehicle steering to rotate the wheel hub about the ball joint connection. In doing so, the opposite contact surfaces of each of the pair of blocks alternately apply pressure between the opposing surfaces of the drive axle housing and the U-joint assembly to gradually dislodge the wheel hub. The hub bolts can remain loosely engaged to the hub to prevent the hub from falling once it is sufficiently loosened.

DETAILED DESCRIPTION

For the purposes of promoting an understanding of the principles of the invention, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

A hub removal tool 10 is provided as shown in FIGS. 4-9. The tool 10 includes two arms 12 in the form of elongated plates. The two arms are connected at their respective upper ends to a support plate 14 by a pair of fasteners 16 and are arranged to in extend in a direction perpendicular to the plane of the support plate. As shown in the cross-sectional view of FIG. 9, the fasteners may include a threaded stem 17 that is engaged within a threaded bore 15 defined in the support plate 14. The fasteners may be provided with a head configured to be readily manually gripped to rotate the threaded stem within the threaded bore, such as a thumb screw and the like. The arms may define an elongated slot 18 through which the threaded stem 17 passes to allow adjustment of the arms relative to the support plate 14 in a direction that is generally perpendicular to the plane of the support plate. The support plate 14 defines a central opening or bore 20 that has a diameter sufficient to slide over the spindle of the ball joint connection J between the drive axle housing D and the knuckle hub K (see FIG. 10). The arms 12 are fastened to the support plate 14 to define a width or gap G dimension that is sufficient to span the U-joint assembly when the support plate 14 is mounted to the spindle of the ball joint J. The arms are elongated so that the lower end of the arms (i.e., opposite the ends connected to the support plate) are positioned in alignment with the space between opposing surfaces of the drive axle housing and the U-joint assembly.

Figure 5:
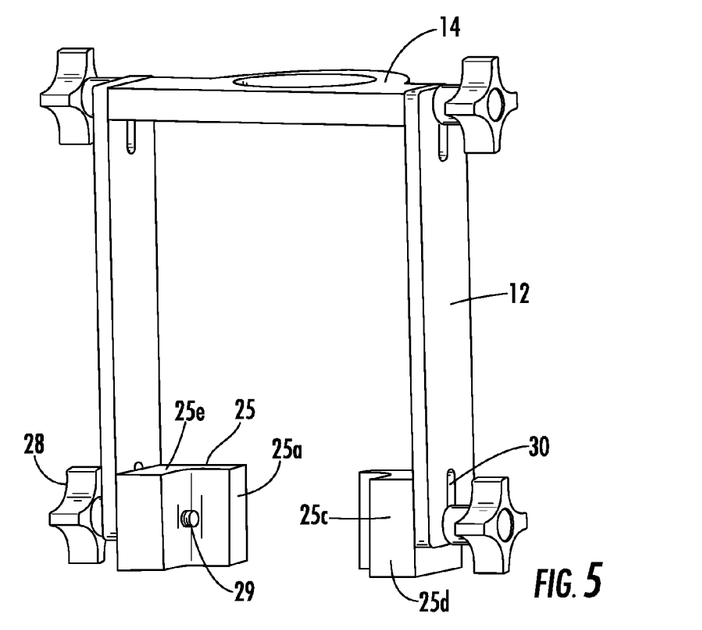
FIG. 5 is a rear perspective view of the hub removal tool shown in FIG. 4.
Figure 6:
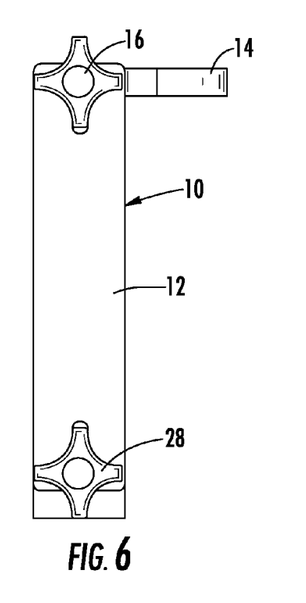
FIG. 6 is a side elevational view of the hub removal tool shown in FIG. 4.

The hub removal tool 10 further includes a pair of blocks 25 fastened to the lower end of the arms 12, as shown in FIG. 1. Fasteners 28 may include a threaded stem 29 for engaging a threaded bore 26 in each of the blocks, as depicted in the cross-section of FIG. 9. The fasteners 28 may be identical to the fasteners 16. The fastener stems pass through an elongated slot 30 in the arms 12 to permit adjustment of the position of the blocks 25 relative to the support plate 14. The blocks 25 include a first portion 25a with a contact face 25b (FIG. 4) adapted for pressure contact with a component of the axle hub and bearing assembly, as described herein. The blocks 25 may be generally L-shaped with the first portion 25a and contact face 25b, and a second portion 25c and contact face 25d (FIG. 5). The contact surface 25d may have a smaller contact area than the contact area of contact surface 25b to accommodate different axle hub and bearing configurations. The block 25 also includes contact surfaces 25e and 25f that can contact the axle hub and bearing assembly when the block is rotated ninety degrees from the orientation pictured in FIGS. 4-5.

Figure 7:
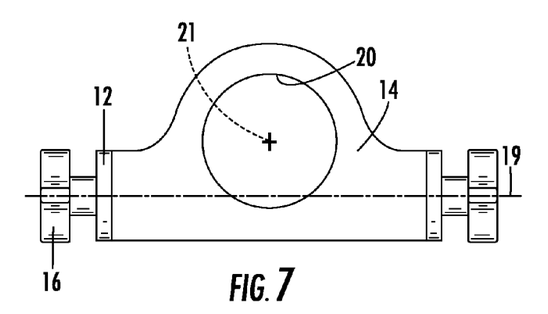
FIG. 7 is a top elevational view of the hub removal tool shown in FIG. 4.
Figure 8:
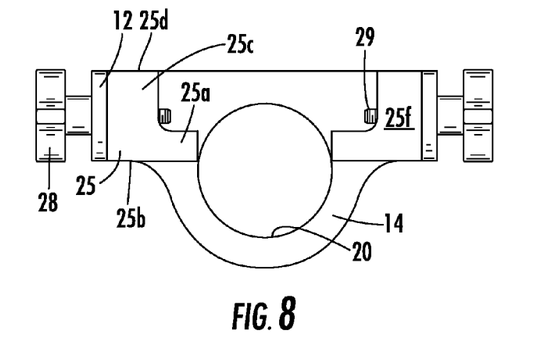
FIG. 8 is a bottom elevational view of the hub removal tool shown in FIG. 4.
Figure 9:
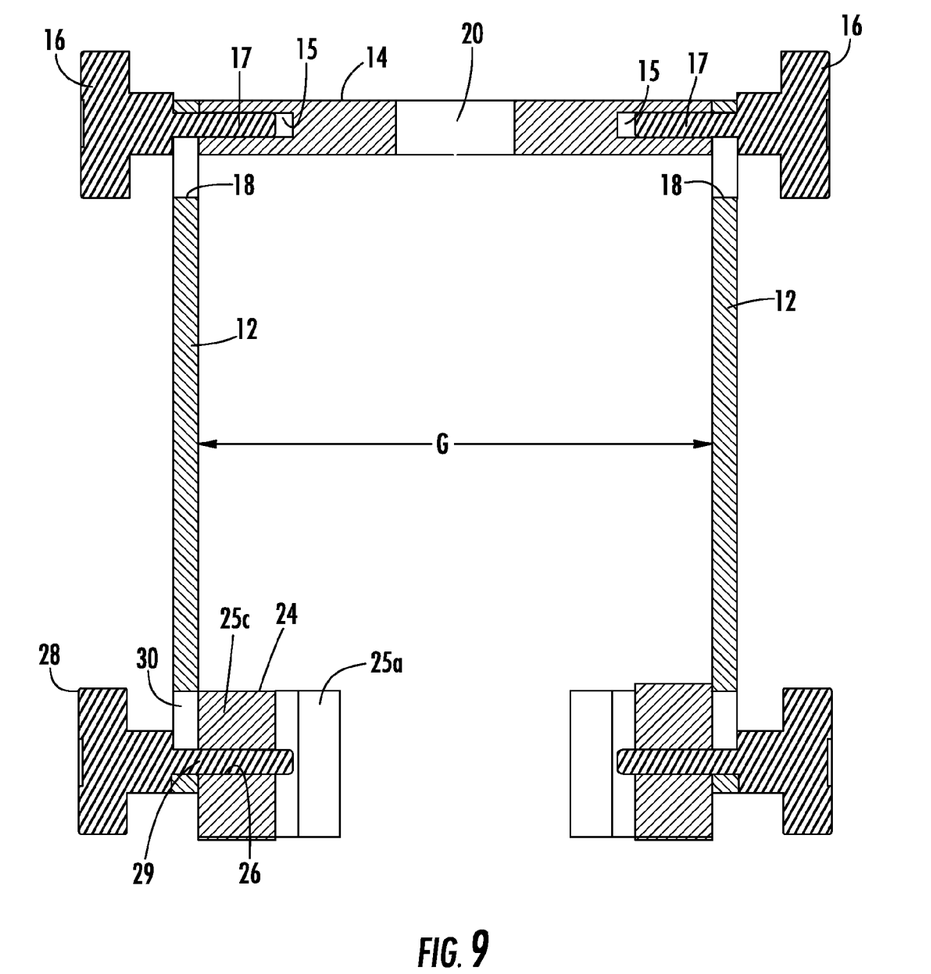
FIG. 9 is a front partial cross-sectional view of the hub removal tool shown in FIG. 4.
Figure 10:
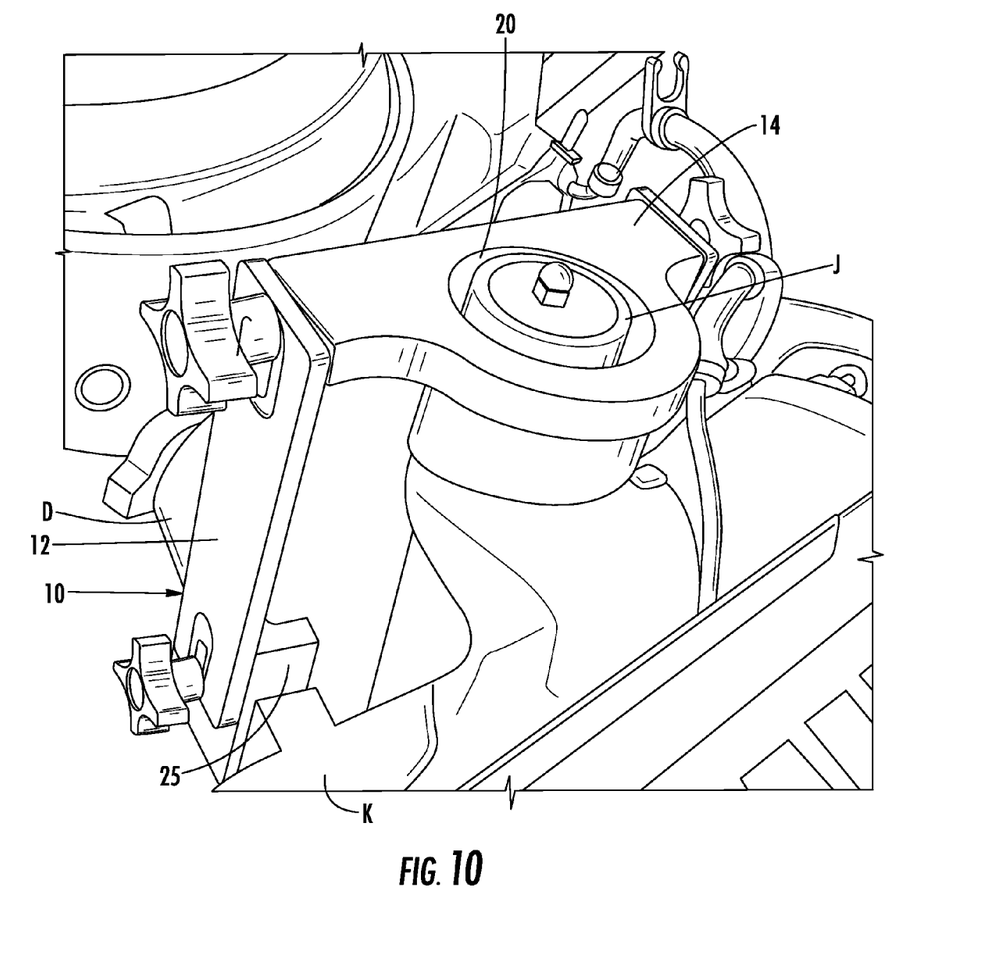
FIG. 10 is a perspective view of the hub removal tool of the present disclosure in position to remove the wheel hub of a vehicle.

As seen in FIG. 7, the bore 20 has a centroid or axis 21 that may be offset from the axis 19 extending through the fasteners 16. This offset helps position the arms 12 between the drive axle housing D and a component of the U-joint assembly U, as illustrated in FIG. 10. The amount of offset may be vehicle dependent based on the geometry of the axle, wheel hub and U-joint assemblies. The bore 20 may be configured so that the support plate 14 may be oriented at an angle relative to the ball joint J. To that end, the bore may be provided with a chamfer or spherical surface facing the ball joint. It is further contemplated that the support plate may be configured to adjust the amount of offset of the bore 20 relative to the axis of the fasteners 16, such as by incorporating the bore into a second plate that is slidably mounted to the support plate 14.

The tool 10 is formed of a high strength material so that it can endure the high loads applied in use without bending or fracturing. Thus, in one embodiment the arms 12, support plate 14 and blocks 25 are formed of a high-strength steel. The arms 12 can have a thickness of ¼ inch and support plate 14 can have a thickness of ½ inch. The threaded stems 17, 29 must also be sufficient strong to withstand the high loads during use. In one specific embodiment for use with a ¾ or 1 ton truck, the arms 12 can have a length of about eight (8) inches. The slots 18, 30 can have a length of about one (1) inch so that the relationship between the arms and the support plate, and between the arms and the blocks, can vary about one inch. The support plate 14 has a width sufficient to produce a gap G between the arms 12 of about six (6) inches which is sufficient to straddle the U-joint assembly. The bore 20 may be offset from the line extending through the axis of the fasteners 16 by a dimension of about 1.5 inches. The blocks 25 may be configured to have a maximum width between the surfaces 25b and 25d of two (2) inches and a minimum width between the surfaces 25e and 25f of about 1.5 inches.

The use of the tool 10 is depicted in FIG. 10. The support plate 14 is mounted on the ball-joint J with the joint spindle projecting through the bore 20. The fasteners 16 may be loosened to allow the arms 12 to be spread outward to allow the tool to be installed onto the drive axle assembly. Once the support plate 14 is seated on the ball-joint J the fasteners can be tightened to fix the arms 12 to the support plate. When the support plate 14 is seated on the joint J the two arms 12 flank the U-joint assembly with each block 25 positioned in contact with diametrically opposite arms of the U-joint. The vertical position of the blocks can be adjusted by adjusting the vertical relationship between the arms 12 and the support plate 14, and/or the vertical relationship between the arms 12 and the blocks 25. It is further noted that the blocks 25 can be adjusted so that any one of the surfaces 25b, 25d, 25e and 25f is in contact with or at least adjacent an arm of the U-joint, while the other surface of the block is in contact with or at least adjacent the drive axle housing D. It is understood that the blocks 25 on both arms and on either side of the U-joint are adjusted as necessary so that the blocks are in contact with or adjacent both the drive axle housing D and the arms of the U-joint U.

With the tool 10 mounted over the axle and hub assembly as pictured, it can be appreciated that the blocks 25 do not need to be in immediate contact with either the U-joint component U or the drive axle housing D. It can also be appreciated that the blocks are maintained in operative position without the need for the additional technician to hold the blocks in position. Yet another benefit is that the tool 10 supports the blocks 25 on diametrically opposite sides of the U-joint assembly U so that the additional technician is not required to move a tool from one side to another. With the tool 10 in the position shown in FIG. 10, only one technician is required to operate the vehicle steering. Specifically, the technician can turn the steering wheel from one side to another in alternating fashion, with each turn closing the gap between the wheel hub H and the drive axle housing H on alternate sides of the hub. As the gap is closed on one side, the block 25 simultaneously contacts the drive axle housing and the U-joint component to exert a pushing force on the U-joint component, which in turn exerts a force on the wheel hub mount M (FIG. 1). This alternating force gradually dislodges the wheel hub from the axle. It can be appreciated that it is preferable to loosen the hub bolts B but leave them engaged so that when the wheel hub is dislodged it does not fall to the floor.

The present disclosure contemplates a wheel hub removal tool that allows a single technician to readily remove the hub using the vehicle steering. The tool is a generally U-shaped bracket that is seated on the ball joint to support a pair of arms on opposite sides of the U-joint assembly. The arms carry corresponding blocks that are sized to seat between the drive axle housing and a component of the U-joint that is coupled to the wheel hub. Alternatively, the blocks may be sized and configured for contact with the hub bolts, as with conventional hub removal tools. The tool of the present disclosure maintains a block on either side of the U-joint assembly so that pressure may be applied alternatively between the blocks to gradually dislodge the wheel hub from the axle. The tool is adjustable to accommodate different axle hub and bearing assembly configurations for different vehicles.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A hub removal tool for removing a wheel hub of a vehicle having a knuckle hub and U-joint assembly between the wheel hub and a drive axle housing, and a ball joint connection between the knuckle hub and the drive axle housing, the tool comprising:
   an elongated support plate defining a bore therethrough sized to seat the support plate on the ball joint connection;
   a pair of elongated arms fastened directly at one end thereof to opposite ends of said elongated plate and sized so that the opposite ends of said arms are positioned in alignment with the space between opposing surfaces of the drive axle housing and the U-joint assembly; and
   a pair of L-shaped blocks, one each fastened directly at the opposite end of a corresponding one of said pair of arms and arranged to be disposed within the space between opposing surfaces, each block defining opposite contact surfaces for directly contacting corresponding ones of said opposing surfaces of the drive axle housing and the U-joint assembly when the vehicle steering is operated to rotate the wheel hub about the ball joint connection.

2. The wheel hub removal tool of claim 1, wherein each block defines two pairs of opposite contact surfaces, each block being adjustably fastened to a corresponding one of said arms so that a selected one of said two pairs of opposite contact surfaces are arranged to contact corresponding ones of said opposing surfaces of the drive axle housing and the U-joint assembly when the vehicle steering is operated to rotate the wheel hub about the ball joint connection.

3. The wheel hub removal tool of claim 2, wherein said arms are fastened to said support plate by manually rotatable threaded fasteners extending through openings in said arms and into threaded bores defined in said support plate.

4. The wheel hub removal tool of claim 3, wherein said openings in said arms are slots elongated along the length of said arms.

5. The wheel hub removal tool of claim 1, wherein each of said pair of arms is adjustably fastened to said elongated plate.

6. The wheel hub removal tool of claim 5, wherein each of said pair of arms is adjustable in a direction perpendicular to the plane of said support plate.

7. The wheel hub removal tool of claim 1, wherein said blocks are fastened to said arms by manually rotatable threaded fasteners extending through openings in said arms and into threaded bores defined in said blocks.

8. The wheel hub removal tool of claim 7, wherein said openings in said arms are slots elongated along the length of said arms.

9. The wheel hub removal tool of claim 1, wherein the fastening of said arms to said support plate defines an axis and said bore is offset transverse to said axis in the plane of said support plate.

10. The wheel hub removal tool of claim 1, wherein each of said blocks is adjustably fastened to the corresponding one of said arms.

11. The wheel hub removal tool of claim 1, wherein said elongated support plate has a length so that said arms define a gap therebetween when fastened to said support plate, said gap sized to straddle the U-joint assembly when the support plate is seated on the ball joint connection.

12. The wheel hub removal tool of claim 1, wherein said opposite contact surfaces have different contact areas.

13. The wheel hub removal tool of claim 1, wherein said bore defines an angled or spherical surface facing the ball joint when the support plate is seated thereon to permit different angular relationships between said support plate and the ball joint.

\* \* \* \* \*

UNITED STATES PATENT AND TRADEMARK OFFICE
CERTIFICATE OF CORRECTION

PATENT NO. : 9,808,920 B2
APPLICATION NO. : 14/621809
DATED : November 7, 2017
INVENTOR(S) : Kevin Rich Page 1 of 1

It is certified that error appears in the above-identified patent and that said Letters Patent is hereby corrected as shown below:

On the Title Page

In Item (54), the title of the invention should read:
TOOL FOR REMOVING A WHEEL HUB ASSEMBLY Signed and Sealed this
Twelfth Day of June, 2018

Andrei Iancu
*Director of the United States Patent and Trademark Office*